United States Patent [19]

English, Jr. et al.

[11] Patent Number: 5,044,154

[45] Date of Patent: Sep. 3, 1991

[54] SAFETY MECHANISM FOR RENDERING A ROCKET MOTOR NON-PROPULSIVE

[75] Inventors: R. Hill English, Jr.; Hermann L. Miskelly, Jr., both of Huntsville, Ala.

[73] Assignee: Thiokol Corporation, Ogden, Utah

[21] Appl. No.: 441,830

[22] Filed: Nov. 27, 1989

[51] Int. Cl.⁵ ............................................. F02K 9/00
[52] U.S. Cl. ...................................... 60/223; 60/254; 60/255
[58] Field of Search ............... 60/204, 223, 253, 254, 60/255; 102/377, 481; 403/32, 316, 317, 318

[56] References Cited

U.S. PATENT DOCUMENTS

| | | | |
|---|---|---|---|
| 3,038,303 | 6/1962 | Gose | 60/253 |
| 3,052,091 | 9/1962 | D'Ooge | 60/253 |
| 3,167,910 | 2/1965 | Weaver | 60/254 |
| 3,613,374 | 10/1974 | Ritchey | 60/253 |
| 3,887,991 | 6/1975 | Panella | 60/223 |
| 4,458,482 | 7/1984 | Vetter et al. | 60/253 |

Primary Examiner—Louis J. Casaregola
Assistant Examiner—John A. Savio, III
Attorney, Agent, or Firm—James C. Simmons; Ronald L. Lyons

[57] ABSTRACT

A rocket motor having case segments which are attached together. A retaining member extends circumferentially thereabout to maintain attachment of the segments together. The retaining member is characterized by sensitivity to a predetermined temperature greater than ambient temperature and less than the ignition temperature of propellant material in the rocket motor to lose strength whereby the retaining member is released and the rocket motor may safely be rendered non-propulsive during a hazard such as a fuel fire or slow cook-off.

20 Claims, 2 Drawing Sheets

SAFETY MECHANISM FOR RENDERING A ROCKET MOTOR NON-PROPULSIVE

The present invention relates generally to rocket motors.

A rocket motor conventionally comprises a cylindrical case which may have two or more segments joined together, a closed forward end, and a nozzle at its aft end. The case is filled with a rapid burning propellant material which, upon ignition, produces gases which are released through the nozzle producing thrust.

When exposed to hazards such as a fuel fire or slow cook-off, the propellant material may be prematurely ignited, and the danger is greatly increased if the rocket motor becomes propulsive as a result.

It is therefore an object of the present invention to automatically render a rocket motor non-propulsive when it is dangerously exposed to heat.

It is a further object of the present invention to provide a means for automatically rendering a rocket motor non-propulsive when it is dangerously exposed to heat wherein there is a minimum increase in weight of the rocket motor.

It is a further object of the present invention to provide such a means which is rugged, reliable, and inexpensive.

In order to achieve the above and other objects, in accordance with the present invention there is provided means for retaining attaching means for a pair of case segments in position, the retaining means being characterized by a sensitivity to a predetermined temperature greater than ambient temperature and less than the ignition temperature of the propellant material to lose strength whereby the attaching means is released to render the rocket motor non-propulsive at the predetermined temperature. Other objects, features, and advantages of the present invention will become apparent in the following detailed description of the preferred embodiments thereof which should be read in connection with the accompanying drawings.

DETAILED DESCRIPTION OF THE PREFERRED EMBODIMENTS

Figure 1:
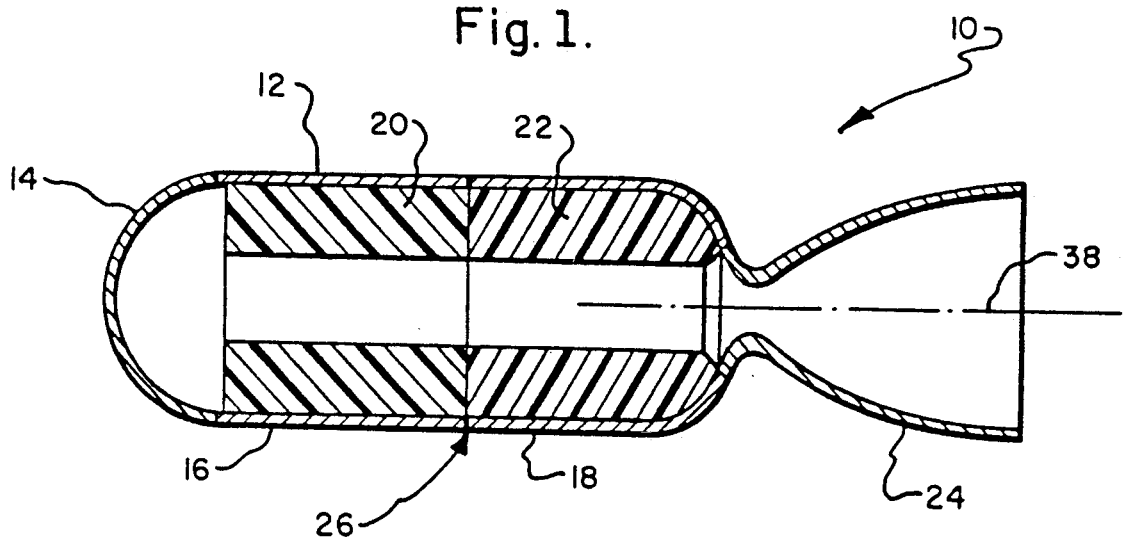
FIG. 1 is a schematic longitudinal sectional view of a rocket motor.

Referring to the drawings, there is illustrated generally at 10 in FIG. 1 a rocket motor which comprises an elongate generally cylindrical case 12 which may be composed of a suitable material such as steel or a resin-impregnated fibrous material of carbon or aramid fibers or the like. The case 12 is suitably enclosed at its forward end such as by a dome portion 14, and payload or cargo or the like may be carried within the dome 14. The case 12 is composed of a forward segment 16 and an aft segment 18 which are joined as will be described in greater detail hereinafter. It should of course be understood that, in accordance with the present invention, the case may be composed of any number of segments. Contained within each of the segments 16 and 18 is a grain of a suitable propellant material 20 and 22 respectively which may be any commonly known solid propellant material, as illustrated, but may be non-solid propellant material, providing the characteristics of performance desired for the rocket motor 10. A typical solid propellant material is characterized by igniting at a high temperature of perhaps 400 degrees Fahrenheit and rapidly burning to produce gases. Suitably attached to the aft end of the aft segment 18 is a conventional converging-diverging nozzle 24 through which the gases are passed to produce thrust for propelling the rocket motor 10. Conventional insulating material (not shown) may be provided between the grains of solid propellant 20 and 22 and the case 12, and a conventional liner (not shown) may be provided between the insulating material and the solid propellant grains 20 and 22 to afford bonding of the propellant thereto in accordance with principles commonly known to those of ordinary skill in the art to which this invention pertains. What has been described thus far with respect to FIG. 1 is a conventional rocket motor the construction and use of which are commonly known to those of Ordinary skill in the art to which this invention pertains.

Figure 2:
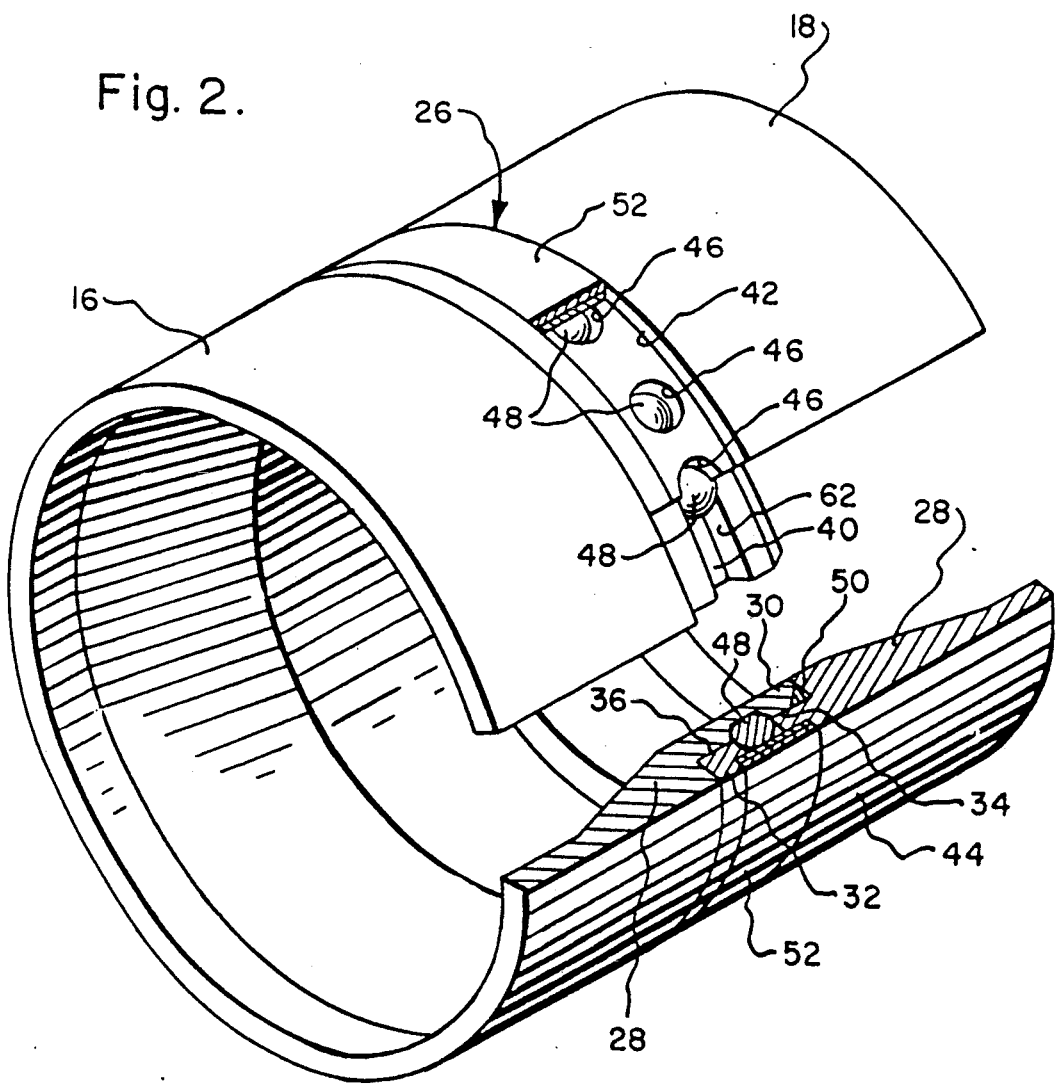
FIG. 2 is a perspective view of a portion of the rocket motor of FIG. 1 illustrating a joint between two segments and the device of the present invention.

Referring to FIG. 2 wherein the portion of rocket motor 10 shown therein is shown absent the propellant, the forward and aft segments 16 and 18 respectively are connected by a joint illustrated generally at 26. As shown in FIG. 2, the inner surface of each of the segments 16 and 18 is tapered to have an enlarged portion 28 adjacent the joint 26 which is perhaps two to three times the segment thickness. At the joint 26 the segments 16 and 18 have reduced thickness overlapping portions 30 and 32 respectively each of which has about half of the thickness of that of the increased thickness portions 28 so that the joint thickness is equal to the thickness of the enlarged portions 28. The forward overlapping portion 30 is radially inwardly of the aft overlapping portion 32, and its radially outer surface 34 faces the radially inner surface 36 of the aft overlapping portion 32 whereby the overlapping portions 30 and 32 engage each other along the surfaces 34 and 36. Thus, the outer diameter of the case 12 is uniform throughout its length. By the term "radial" or "radially" is meant, for the purpose of this specification and the claims, a direction toward or away from the axis 38 of the rocket motor. By the term "axial" or "axially", as used in the specification and the claims, is meant a direction generally parallel to or along the axis 38.

A groove 40 is provided in the radially outer surface 34 of the forward overlapping portion 30 which extends circumferentially about overlapping portion 30. A groove 42 is provided in the radially outer surface 44 of the aft overlapping portion 32 which extends circumferentially about overlapping portion 32 and generally axially centrally thereof to be in axial alignment with groove 40. A plurality of apertures 46 are provided axially centrally of the groove 42, i.e., intermediate the edges of groove 42, which apertures 46 extend through the aft overlapping portion 32 and are spaced circumferentially thereabout for alignment axially with the groove 40 when the overlapping portions 30 and 32 are engaged for attachment so that the apertures 46 open into and communicate radially inwardly thereof with the groove 40 and open into and communicate radially outwardly thereof with the groove 42. The diameter of each of the apertures 46 is substantially the same as the width of the groove 40 along surface 34. In order to attach or hold the forward and aft segments 16 and 18 respectively together, a plurality of locking members 48, which may be spherically shaped, are disposed partly in the groove 40 and partly in the apertures 46 to "lock" the segments 16 and 18 together. Thus, the diameter of each of the locking members 48 is substantially equal to but slightly less than the diameter of the respective aperture 46 and the width of the groove 40 along surface 34, and the depth of the groove 40 may typically be equal to half of the diameter of each of the locking members 48 so that the locking members 48 may fit snugly within the apertures 46 and groove 40 to minimize free play between the segments 16 and 18. The locking members 48 may be composed of any suitable material such as, for example, hardened steel ball bearings. The joint 26 may be sealed against the escape of gases by suitable means such as O-ring 50, the axially outer radially outer corner of portion 30 being canted to receive the O-ring 50.

Figure 6:
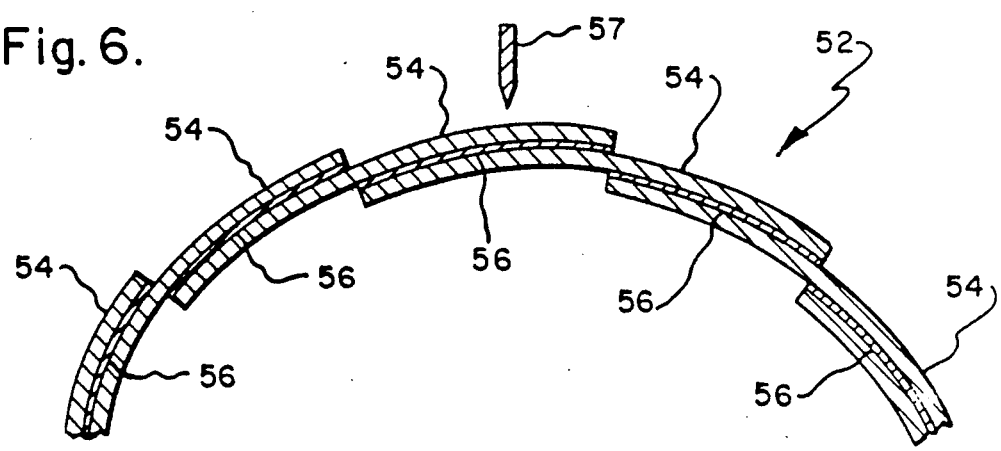
FIG. 6 is a schematic partial sectional view of the retaining means for the joint.

A retaining ring 52 the composition of which will be described hereinafter is provided in the groove 42 in order to retain the locking members 48 in position in the apertures 46 and groove 40. In case of a fuel fire, slow cook-off, or other emergency where heat which may ignite the propellant material 20 and 22 is dangerously applied to the exterior of the rocket motor 10, it is desirable that the joint 26 be opened so that the gases produced during burning of the propellant 20 and 22 may escape through open ends of the segments 16 and 18 as well as through the nozzle 24 to thus render the rocket motor non-propulsive. In order to achieve such a result, in accordance with the present invention the retaining ring 52 is composed to be strong enough to retain the balls 48 in the apertures 46 and groove 40 during normal storage and operation of the rocket motor 10 yet be able to fail and release the balls 48 at a predetermined temperature greater than the ambient temperature and less than the ignition temperature of the propellant material 20 and 22 whereby the rocket motor 10 is rendered non-propulsive at the predetermined temperature. In accordance with a preferred embodiment of the present invention, the retaining ring 52, as illustrated schematically in FIG. 6, is composed of a plurality of strips 54 of high-strength material such as, for example, steel or a composite of a resin impregnated fibrous material such as graphite, carbon, or glass fibers. The strips 54 are lap bonded together with an adhesive illustrated at 56. Thus, each strip 54 overlaps and is bonded to the preceding strip. The adhesive 56 is selected to provide a high shear strength over a temperature range which includes the ambient temperature and temperatures higher than ambient but which degrades and breaks down at the predetermined temperature. The adhesive may, for example, be an epoxy, a phenolic, or a solder. The retaining ring 52 may thus be composed of, for example, graphite/epoxy strips with a suitable adhesive or steel strips with a suitable low-temperature solder. Thus, at the predetermined temperature, which may, for example, be 300 degrees Fahrenheit, which is greater than the ambient temperature but which is less than the ignition temperature of perhaps 400 degrees Fahrenheit of the propellant material 20 and 22, the bond between the strips 54 will desirably fail and the retaining ring 52 will separate. The retaining ring 52 is composed of a plurality of strips 54 to better ensure that the application of heat on any side of the rocket motor 10 will heat the adhesive 56 at a lap joint to cause the retaining ring 52 to fail. The number, length, and strength of strips 54 will vary depending on motor diameter and operating pressure and may be determined using principles commonly known to those of ordinary skill in the art to which this invention pertains.

If desired, an electrically actuated cutting mechanism, illustrated schematically at 57 in FIG. 6, such as, for example, a mild detonating fuse or a linear shaped charge, may be provided to cut the retaining ring 52 upon a command signal so that the rocket motor 10 may be rendered non-propulsive on command.

Figure 3:
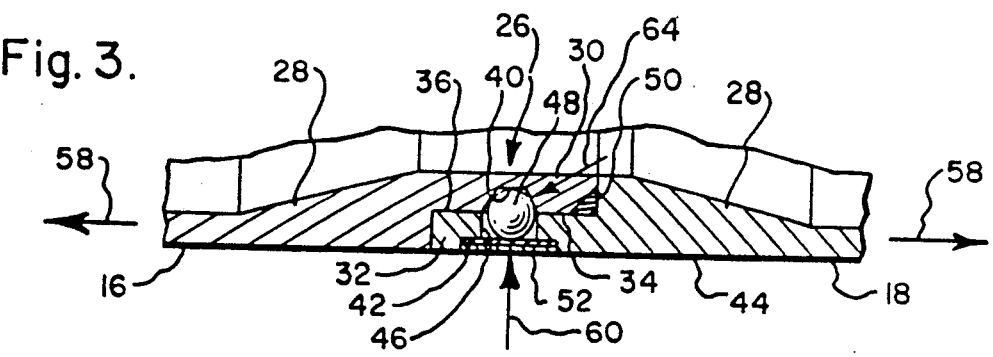
FIG. 3 is a schematic longitudinal half sectional view of the rocket motor portion of FIG. 2 illustrating normal operation thereof.
Figure 4:
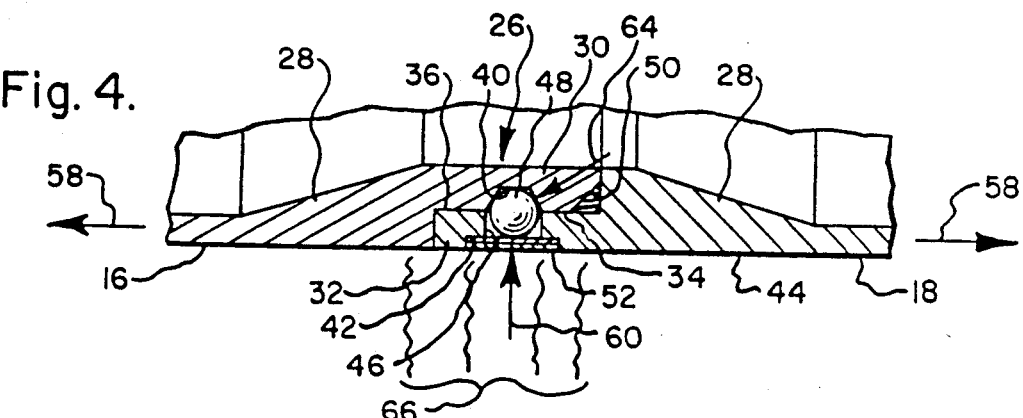
FIG. 4 is a view similar to that of FIG. 3 illustrating the application of external heat to the rocket motor.
Figure 5:
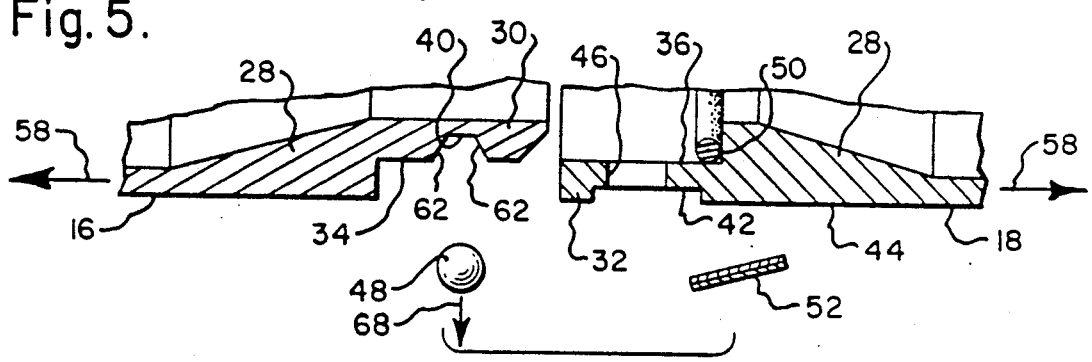
FIG. 5 is a view similar to that of FIG. 3 illustrating separation of the joint after the application of external heat.

During propulsion of the rocket motor 10, separating forces, as illustrated by arrows 58 in FIGS. 3 to 5, act on the segments 16 and 18. During such normal use, the ball members 48 are held in position to prevent such separation by the force applied by retaining ring 52, as illustrated by arrow 60. As most clearly illustrated in FIG. 5, both side faces 62 of the groove 40 are preferably canted outwardly slightly so that groove 40 is widest at the surface 34 to cause a small force, illustrated at 64 in FIGS. 3 and 4, to be applied to the locking balls 48 by each of the canted faces 62 to aid in releasing the balls 48 from the apertures 46 and groove 40 upon failure and release of the retaining ring 52 so as to better ensure separation of the segments 16 and 18.

During manufacture of the rocket motor 10, the overlapping portions 30 and 32 of the segments are brought into engagement with each other, and the locking balls 48 are inserted into the groove 40 through the apertures 46 to be partly in the groove 40 and partly in the apertures 46, and the retaining ring 52 is then installed in the groove 42 by adhesively joining overlapping strips 54 at each end with adhesive 56 to retain the balls 48 therein. When the rocket motor 10 is pressurized and not subject to external heating, the locking balls 48 are provided to prevent the two segments 16 and 18 from separating. However, when external heating such as a fuel fire or slow cook-off is applied to the retaining ring 52 at the predetermined temperature, such as illustrated at 66 in FIG. 4, it fails and the locking balls 48 are forced out of the groove 40, as illustrated by arrow 68 in FIG. 5, whereby the case segments 16 and 18 separate, and the rocket motor 10 is rendered non-propulsive.

It should be understood that while the invention has been described in detail herein, the invention can be embodied otherwise without departing from the principles thereof, and such other embodiments are meant to come within the scope of the present invention as defined by the appended claims.

What is claimed is:

1. A rocket motor comprising an elongated generally cylindrical case having a first case segment, a second case segment, propellant material having an ignition temperature disposed within said case, means for attaching said first and second case segments, and means extending circumferentially about said case for retaining said attaching means in position for maintaining attachment of said first and second case segments, said retaining means including means throughout the circumference thereof for effecting loss of strength of said retaining means when said retaining means is subjected, at any location along the circumference of said retaining means, to a predetermined temperature greater than ambient temperature and less than said ignition temperature of said propellant material whereby said attaching means is released to render the rocket motor non-propulsive at said predetermined temperature.

2. A rocket motor comprising an elongated generally cylindrical case having a first case segment, a second case segment, propellant material having an ignition temperature disposed within said case, means for attaching said first and second case segments, means for retaining said attaching means in position for maintaining attachment of said first and second case segments, said retaining means characterized by a sensitivity to a predetermined temperature greater than ambient temperature and less than said ignition temperature of said propellant material to lose strength whereby said attaching means is released to render the rocket motor non-propulsive at said predetermined temperature, and wherein said retaining means comprises a plurality of strips of strength bearing material and bonding agent for lap bonding said strips together, said bonding agent characterized by degrading at said predetermined temperature whereby the strips of material separate.

3. A rocket motor according to claim 2 wherein said bonding agent is selected from the group of bonding agents consisting of an epoxy, a phenolic, and a solder.

4. A rocket motor according to claim 2 wherein said strips are composed of a material selected from the group of materials consisting of steel and a composite of resin impregnated fibrous material.

5. A rocket motor according to claim 1 further comprising means for severing said retaining means in response to a signal.

6. A rocket motor comprising an elongated generally cylindrical case having a first case segment, a second case segment, propellant material having an ignition temperature disposed within said case, said second case segment having an end portion, said first case segment having an end portion which overlaps said end portion on said second case segment, a circumferential surface on said first case segment end portion which surface faces said second case segment end portion, a circumferential groove means in said surface, a plurality of locking members, said second case segment having a plurality of aperture means spaced circumferentially thereof and in alignment with said circumferential groove means for receiving said plurality of locking members with each of said locking members received partially in said groove means and received partially in said respective aperture means for attaching said first case segment to said second case segment, means extending circumferentially about said case for retaining said locking members in said groove means and said aperture means, said retaining means including means throughout the circumference thereof for effecting loss of strength of said retaining means when said retaining means is subjected, at any location along the circumference of said retaining means, to a predetermined temperature greater than ambient temperature and less than the ignition temperature of said propellant material whereby the locking members are released to render the rocket motor non-propulsive at said predetermined temperature.

7. A rocket motor according to claim 6 wherein said groove means has a pair of side walls at least one of which is canted outwardly.

8. A rocket motor comprising an elongated generally cylindrical case having a first case segment, a second case segment, propellant material having an ignition temperature disposed within said case, said second case segment having an end portion, said first case segment having an end portion which overlaps said end portion on said second case segment, a circumferential surface on said first case segment end portion which surface faces said second case segment end portion, a circumferential groove means in said surface, a plurality of locking members, said second case segment having a plurality of aperture means spaced circumferentially thereof and in alignment with said circumferential groove means for receiving said plurality of locking members with each of said locking members received partially in said groove means and received partially in said respective aperture means for attaching said first case segment to said second case segment, means extending circumferentially about said case for retaining said locking members in said groove means and said aperture means, said retaining means characterized by a sensitivity to a predetermined temperature greater than ambient temperature and less than the ignition temperature of said propellant material to lose strength whereby the retaining means is released and the rocket motor is rendered non-propulsive at said predetermined temperature, and wherein said retaining means comprises a plurality of strips of strength bearing material and a bonding agent for lap bonding said strips together, said bonding agent characterized by degrading at said predetermined temperature whereby the strips of material separate.

9. A rocket motor according to claim 8 wherein the groove means has a pair of side walls at least one of which is canted outwardly.

10. A rocket motor according to claim 8 wherein said bonding agent is selected from the group of bonding agents consisting of an epoxy, a phenolic, and a solder.

11. A rocket motor according to claim 10 wherein said strips are composed of a material selected from the group of materials consisting of steel and a composite of resin impregnated fibrous material.

12. A rocket motor according to claim 6 wherein said groove means has a pair of side walls both of which are canted outwardly to aid in expelling said locking member from said groove means upon release of said retaining means.

13. A rocket motor according to claim 6 wherein said locking members are ball bearings.

14. A rocket motor according to claim 13 wherein said groove means has a pair of side walls at least one of which is canted outwardly.

15. A rocket motor according to claim 13 wherein said groove means has a pair of side walls both of which are canted outwardly to aid in expelling said locking members from said groove means upon release of said retaining means.

16. A rocket motor comprising an elongated generally cylindrical case having a first case segment, a second case segment, propellant material having an ignition temperature disposed within said case, an end portion on said second case segment, an end portion on said first case segment which overlaps said end portion on said second case segment, a circumferential surface on said first case segment end portion which surface faces said second case segment end portion, a circumferential groove means in said surface, a plurality of locking members, said second case segment having a plurality of aperture means spaced circumferentially thereof and in alignment with said circumferential groove means for receiving said plurality of locking members with each of said locking members received partially in said groove means and received partially in said respective aperture means for attaching said first case segment to said second case segment, means extending circumferentially about said case for retaining said locking members in said groove means and said aperture means, said retaining means comprising a plurality of strips of strength bearing material and a bonding agent for lap bonding said strips together, said bonding agent characterized by degrading and losing strength at a predetermined temperature greater than ambient temperature and less than the ignition temperature of said propellant material whereby the strips of material separate to allow release of the locking members from the groove means to render the rocket motor non-propulsive at said predetermined temperature.

17. A rocket motor according to claim 16 wherein said bonding agent is selected from the group of bonding agents consisting of an epoxy, a phenolic, and a solder.

18. A rocket motor according to claim 16 further comprising means for severing said retaining means in response to a signal.

19. A rocket motor according to claim 16 wherein said groove means has a pair of side walls both of which are canted outwardly to aid in expelling said locking members from said groove means upon release of said retaining means.

20. A rocket motor according to claim 19 wherein said locking members are ball bearings.

* * * * *